May 11, 1943.     L. D. HOLMES     2,318,996
VEHICLE WASHING APPARATUS
Filed Feb. 6, 1941      2 Sheets-Sheet 1
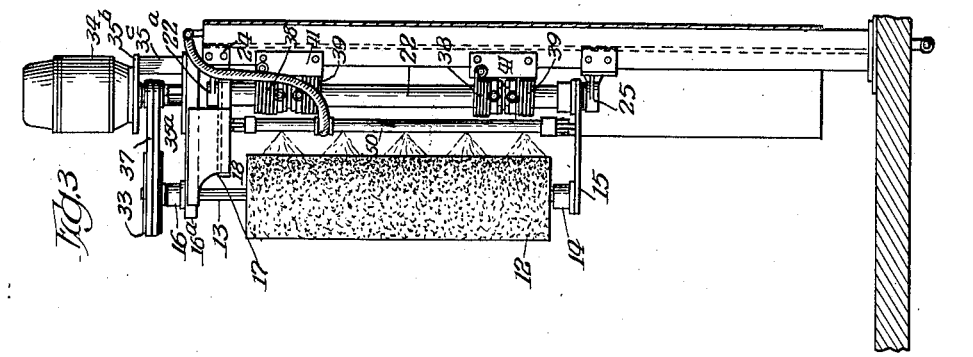
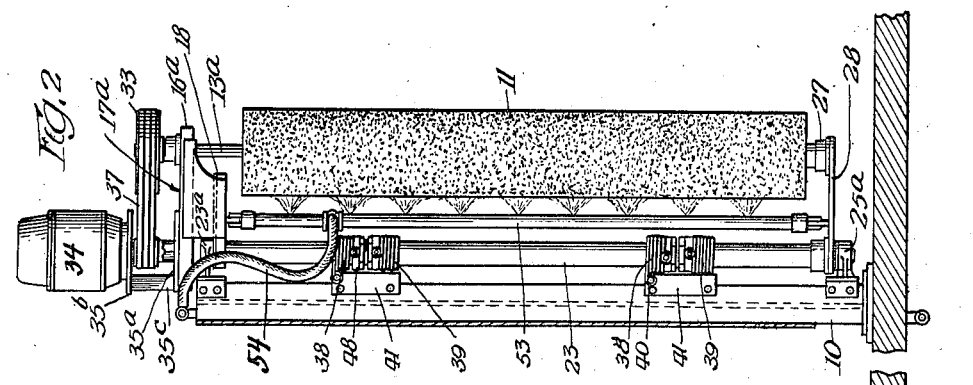
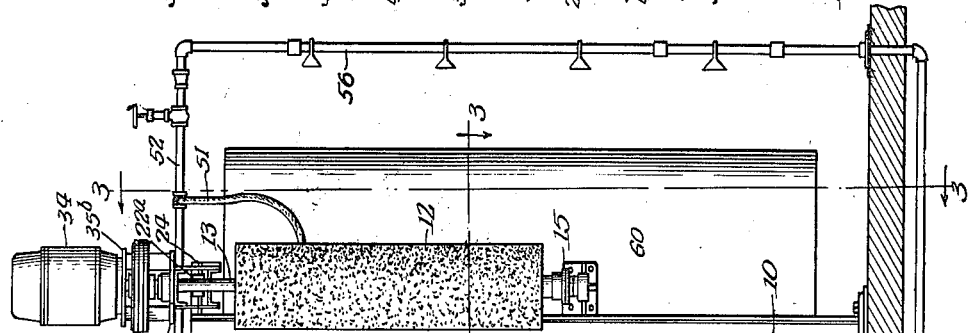
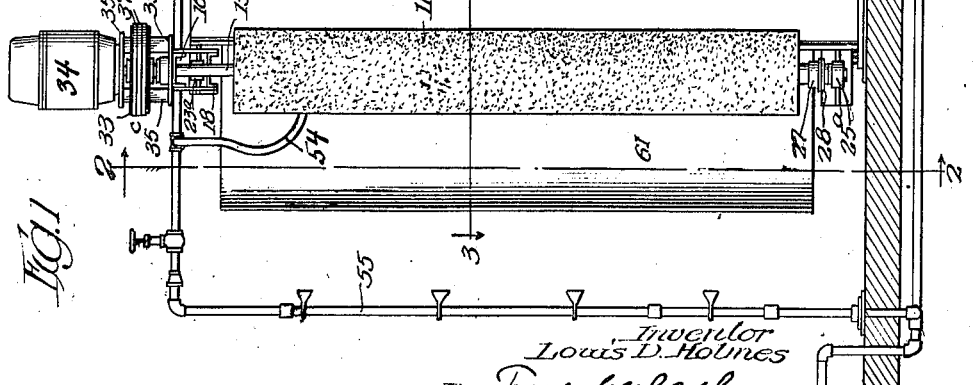

May 11, 1943.   L. D. HOLMES   2,318,996
VEHICLE WASHING APPARATUS
Filed Feb. 6, 1941   2 Sheets-Sheet 2
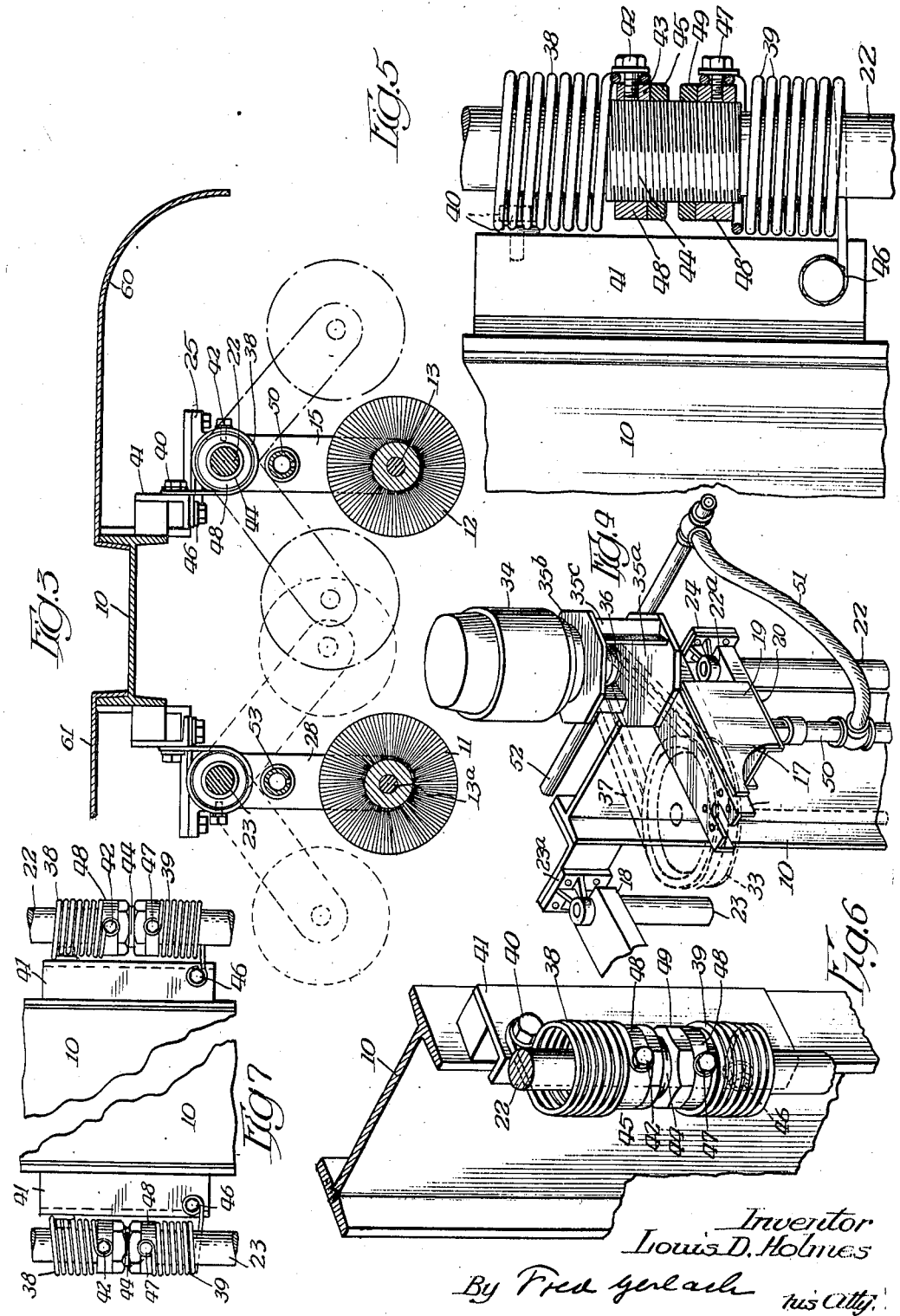
Inventor
Louis D. Holmes
By Fred Gerlach his Atty.

Patented May 11, 1943

2,318,996

UNITED STATES PATENT OFFICE 2,318,996

VEHICLE WASHING APPARATUS

Louis D. Holmes, Harvey, Ill., assignor to Whiting Corporation, Harvey, Ill., a corporation of Illinois Application February 6, 1941, Serial No. 377,652

2 Claims. (Cl. 15—53)

The invention relates to apparatus for washing vehicles and, more particularly, to that type of apparatus which is designed to wash railway cars or busses while the vehicles are moved past, and engage, motor-driven vertical rotary brushes at one or both sides of the vehicle.

One object of the invention is to provide car-washing apparatus which comprises one or more vertical brushes which are mounted to swing horizontally and yieldable for engagement with the side of the car as it travels past the brushes so that the apparatus is inherently or automatically adapted to wash cars moving in either direction. This object is attained primarily by providing a horizontally swinging support for each brush which is normally held by spring-means in a centralized position so that it can be deflected in opposite directions by a car as it travels past the brushes in either direction, and will be pressed against the side of the car when it is deflected in either direction by the moving car or vehicle, and will automatically return to its centralized position after the car has traveled past the brushes.

Other objects of the invention will appear from the detailed description.

The invention consists in the several novel features which are hereinafter set forth and are more particularly defined by claims at the conclusion hereof.

In the drawings: Fig. 1 is a front elevation of a washing unit comprising a pair of brushes for washing one side of a car. Fig. 2 is a section taken on line 2—2 of Fig. 1. Fig. 3 is a horizontal section taken on line 3—3 of Fig. 1. Fig. 4 is a perspective of one of the upper brush-supporting arms and the motor mounted thereon. Fig. 5 is a side elevation of one of the spring-centering devices, parts being shown in section. Fig. 6 is a perspective of one of the spring-centering devices. Fig. 7 is a front elevation of the supporting mast and the upper spring-centering devices.

In practice, the equipment usually comprises two similar washing units which are disposed at the sides of a driveway or track for simultaneously washing the oppoiste sides of a vehicle, as well understood in the art. These units are alike in construction, so that only one is illustrated and described.

Each washing unit comprises a central upright I-beam which constitutes a supporting mast 10 and is fixedly mounted on the floor or roadway, a vertical rotary brush 11 of sufficient height to traverse and wash the entire side of the car, and a shorter vertical rotary brush 12 for washing the windows of the car. The shaft 13 of brush 12 is journaled at its lower end in a suitable bearing 14 which is carried by a horizontal arm 15 and at its upper end in a bearing 16 which is supported on a horizontal arm 17 which is vertically aligned with arm 15. Arms 15 and 17 are rigidly secured to a pivot-rod or shaft 22. Said shaft is journaled at its upper end in a bearing 22ª which is rigidly connected by a bracket 24 to one side of the mast 10 and at its lower end in a bearing 25 which is fixedly and similarly supported from said mast. Rod 22 and arms 15 and 17 constitute a vertical horizontally swinging support which carries the rotary brush 12 so that it will be normally positioned in the path of the car and will be deflected thereby as the vehicle travels past the brush in either direction.

The shaft 13ª of rotary brush 11 is journaled at its upper end in a bearing 16 on arm 17ª and its lower end in a bearing 27 which is carried by an arm 28. Arms 17ª and 28 for supporting brush 11 are fixed to a pivot-shaft 23. Arm 28 carries the lower bearing 27 for said shaft. Shaft 23 is journaled at its upper end in a bearing 16ª and at its lower end in a bearing 25ª which are supported by brackets from one side of the mast 10, similar to those which support shaft 22.

Each of the upper brush-supporting arms 17, 17ª is built up of a lower channel-beam 18, which is fixed to one of the pivot-shafts, side-plates 19 fixed to the sides of beam 18, and an upper channel-beam 20, which is fixed to and between the side-plates 19.

Electric motors 34 are mounted on brackets 35, respectively, which are fixed to swing with the arms 17, 17ª. Each bracket 35 comprises a lower plate 35ª welded to the top-face of a beam 16ª, an upper plate 35ᵇ, and vertically extending plates 35ᶜ which are welded to the upper and lower plates. The shaft of each motor extends downwardly through the upper plate 35ᵇ and carries a belt-pulley 36 in the space between plates 35ª and 35ᵇ. Each of the brush-shafts has fixed to its upper end a belt-pulley 33, which is driven by belts 37 from one of the pulleys 36 on one of the motors. The shafts of the motors are coaxial with the pivot-shafts 22, 23, respectively, to which arms 17, 17ª are secured, so that said arms can swing horizontally without bodily movement of the motor.

The pivoted supporting-arms for the brushes are normally centralized or extend inwardly at right angles to the track for, or the path of travel of the vehicle and are free to swing angularly in opposite directions from their centralized positions when the brushes are deflected by the vehicle, as indicated by dotted lines in Fig. 4, for the purpose of adapting the apparatus to wash vehicles traveling to the right or to the left. Each of the brushes is normally and yieldingly held in its centralized position by spring-devices which are applied to press the supporting-arms into their centralized position and which cause the brushes, while revolving and deflected by the vehicle, to engage the side of and wash the vehicle.

A pair of centering devices of similar construction are applied to each of the shafts 22 and 23. Each of these devices comprises an upper spring 38, which is coiled around one of the pivot-shafts, has its lower end fixedly secured to said shaft, and has its upper end fixed to a stationary element, so that when the supporting-arms and the brush carried by said shaft are swung in one direction from their normal centralized position, said spring will be wound to increase its torsion, and a lower spring 39, which is also coiled around, and has its upper end fixedly connected to, the pivot-shaft and its lower end fixed to the supporting structure, so that it will be wound to increase its torsion when the pivot-shaft and arms are swung in the opposite direction.

The upper end of each spring 38 is attached by a screw 40 to an angle-plate 41, which is rigidly secured to one of the side-flanges of the mast 10. The lower end of each spring 38 is secured by a screw 42 to a screw-collar 43 which is threaded to a screw-thread 45 on the pivot-shaft. A lock-nut 45 secures the screw-collar 43 against rotation on thread 44. The lower end of each spring 39 is secured by a screw 46 to angle-plate 41 and its upper end is secured by a screw 47 to a screw-collar 48, which is threaded to the screw-thread 45 on the pivot-shaft. A lock-nut 49, threaded to screw 44, is adapted to secure collar 48 against rotation relatively to the pivot-shaft. By rotative adjustment of the collars 43 and 48 on the pivot-shaft, the springs may be adjusted and equalized so that the supporting-arms on the pivot-shaft and the brushes carried thereby will be normally held in their centralized position. When a vehicle traveling to the left, approaches the brushes, the brushes 12 and 13 will be deflected to the right, and the supporting-arms will be swung to the right and rotate the pivot-shafts 22, 23, so they will rotate collars 48 and the ends of springs which are attached thereto. This will wind one spring of each centering-device to progressively increase its torsion. As a result, the brushes will be pressed against the car traveling past the brushes. During this rotation of the pivot-shafts, the other spring of each centering-device will be unwound. As soon as the vehicle has passed the brushes, the torsion of one spring of each centering-device will restore the brushes and their supporting-arms to their centralized position. When a vehicle traveling to the right approaches the brushes, it will deflect them to the right and swing their supporting-arms to the left, which will cause the pivot-shafts to rotate and progressively increase the torsion of one spring of each centering-device. While the brushes are deflected, they will engage the sides of the car and be continuously rotated for washing purposes. As soon as the car passing to the right travels beyond the brushes, the springs which are under torsion will automatically rotate the pivot-shafts, supporting-arms and brushes to their centralized position in readiness for the next washing operation.

In operation, the brushes 11 and 12 and their supporting-arms will be normally held in their centralized position. The brushes will be driven by the motors 34, respectively. The car to be washed may be moved to travel past the washing unit in either direction. As the car reaches the brushes, it will deflect them in the direction of the travel of the car against the torsion of one spring of each pair of springs of each of the pairs of centralizing devices applied to the pivot-shafts, so that the brushes will be pressed against and wash the sides of the car. After the car clears the brushes, the spring-devices will automatically shift the supporting-arms and brushes to their centralized position in readiness for washing a car approaching the brushes from either the right or the left. During the travel of the car past the brushes, water will be sprayed onto them by spray pipes 50, 53 and onto the side of the car by spray-pipes 55 and 56.

A spray-pipe 50 extends vertically between and is carried by arms 15 and 17 which support brush 12 for discharging jets of water onto the brush 12 while it is being driven for washing the vehicle. A flexible pipe-section 51 supplies water to jet-pipe 50 from a supply-pipe 52. A vertical spray-pipe 53 is supported by arms 29 and 17a for brush 11 to discharge jets of water onto said brush. A flexible pipe 54 supplies water to jet-pipe 53 from supply-pipe 52. Vertical jet-pipes 55 and 56 are adapted to jet streams of water on the side of the car or vehicle as it is approaching and after being washed by the brushes. Spray-shields 60 and 61 are secured to the mast to confine the splash from the brushes so it will not be projected outwardly of the mast.

The invention exemplifies vehicle-washing apparatus in which the rotary brushes are normally held in a centralized position by spring-devices and are shiftable to the right or left by the vehicle according to direction of travel of the vehicle, and in which the brushes are pressed against the side of the vehicle while deflected in either direction from their centralized positions. This makes it possible to wash cars which are traveling in either direction past the washing means without changing the setting of the brushes or devices for pressing the brushes against the vehicle.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In washing-apparatus for vehicles, the combination of a supporting structure, a vertically extending motor-driven rotary brush adapted to engage the side of the vehicle, a pair of brush-supporting arms above and below the brush, respectively, a shaft between said arms pivotally supported by the structure, said brush and arms being mounted to swing horizontally and adapted to be deflected in opposite directions from a normally centralized position by the vehicle, a device comprising a pair of coil-springs around the shaft for normally and yieldingly holding the arms and brush in their centralized position and pressing the brush against the vehicle for washing when deflected in either of said opposite directions by the movement of the vehicle past and against the brush, each spring having one of its ends connected to the shaft and its other end to the supporting structure, and devices rotatively adjustable on the shaft to which the ends of the springs are respectively connected and adapted for individual adjustment of the torsion of the springs.

2. In washing apparatus for vehicles, the combination of a supporting structure, a vertically extending motor-driven rotary brush adapted to engage the side of the vehicle, a pair of brush-supporting arms, one above and the other below the brush, respectively, a shaft between said arms pivotally supported by the structure, said brush and arms being mounted to swing horizontally and adapted to be deflected in opposite directions from a normally centralized position by the vehicle, a pair of coil-springs around the shaft, for normally and yieldingly holding the arms and brush in their centralized position and pressing the brush against the vehicle for washing when deflected in either of said opposite directions by the movement of the vehicle past and against the brush, and collars adjustably connected to the shaft to which one of the ends of the springs is connected, the other ends of the springs being connected to the supporting structure.

LOUIS D. HOLMES.